(12) United States Patent
Kenney et al.

(10) Patent No.: US 9,655,040 B2
(45) Date of Patent: May 16, 2017

(54) METHODS AND ARRANGEMENTS FOR LOW POWER WIRELESS NETWORKS

(71) Applicant: Intel Corporation, Santa Clara, CA (US)

(72) Inventors: Thomas J. Kenney, Portland, OR (US); Eldad Perahia, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/624,366

(22) Filed: Feb. 17, 2015

(65) Prior Publication Data

US 2015/0327166 A1 Nov. 12, 2015

Related U.S. Application Data

(63) Continuation of application No. 13/977,698, filed as application No. PCT/US2011/068253 on Dec. 30, 2011, now Pat. No. 8,989,102.

(60) Provisional application No. 61/479,024, filed on Apr. 26, 2011.

(51) Int. Cl.
*H04W 4/00* (2009.01)
*H04W 52/02* (2009.01)
*H04L 27/26* (2006.01)
*H04L 29/06* (2006.01)

(52) U.S. Cl.
CPC ......... *H04W 52/02* (2013.01); *H04L 27/2613* (2013.01); *H04L 69/22* (2013.01)

(58) Field of Classification Search
CPC ..... H04W 52/02; H04L 69/22; H04L 27/2613
See application file for complete search history.

(56) References Cited

U.S. PATENT DOCUMENTS

| 8,773,969 | B1 * | 7/2014 | Zhang | H04L 27/2602 370/208 |
| 9,226,270 | B1 * | 12/2015 | Zhang | H04W 72/04 |
| 9,276,790 | B2 * | 3/2016 | Zheng | H04L 27/20 |
| 2010/0309834 | A1 * | 12/2010 | Fischer | H04B 7/0452 370/312 |
| 2010/0309848 | A1 * | 12/2010 | Erceg | H04L 5/0023 370/328 |

(Continued)

FOREIGN PATENT DOCUMENTS

| JP | 2008-530909 | 8/2008 |
| JP | 2014-505436 | 2/2014 |
| JP | 2014-506088 | 3/2014 |

OTHER PUBLICATIONS

Extended European Search Report received for European Patent Application No. 11864433.5, mailed Feb. 4, 2015, 7 pages.

(Continued)

*Primary Examiner* — Clemence Han

(57) ABSTRACT

Embodiments may comprise an orthogonal frequency division multiplexing (OFDM) system operating in the 1 GHz and lower frequency bands. In many embodiments, physical layer logic may implement a new preamble structure with a new signal field. Embodiments may store the preamble structure and/or a preamble based upon the new preamble structure on a machine-accessible medium. Some embodiments may generate and transmit a communication with the new preamble structure. Further embodiments may receive and detect communications with the new preamble structure.

26 Claims, 6 Drawing Sheets

(56) References Cited

U.S. PATENT DOCUMENTS

| | | | | |
|---|---|---|---|---|
| 2010/0310002 A1* | 12/2010 | Lauer | ................... | H04L 1/0026 375/267 |
| 2010/0322219 A1* | 12/2010 | Fischer | ................ | H04B 7/0452 370/338 |
| 2011/0002219 A1* | 1/2011 | Kim | ................... | H04B 7/0417 370/203 |
| 2011/0013616 A1* | 1/2011 | Fischer | ................ | H04B 7/0669 370/344 |
| 2011/0032875 A1* | 2/2011 | Erceg | ................... | H04B 7/0452 370/328 |
| 2011/0116565 A1 | 5/2011 | Mujtaba | | |
| 2011/0194475 A1* | 8/2011 | Kim | ................... | H04L 1/0053 370/311 |
| 2011/0222490 A1* | 9/2011 | Fischer | ................ | H04L 5/0007 370/329 |
| 2011/0255620 A1* | 10/2011 | Jones, IV | ............. | H04L 5/0046 375/260 |
| 2011/0305178 A1* | 12/2011 | Zheng | ................ | H04B 7/0671 370/311 |
| 2011/0305194 A1* | 12/2011 | Zheng | ................ | H04B 7/0452 370/328 |
| 2012/0051454 A1* | 3/2012 | Zheng | ................ | H04L 5/0048 375/295 |
| 2012/0170563 A1* | 7/2012 | Abraham | ........... | H04L 27/2607 370/338 |
| 2012/0195391 A1 | 8/2012 | Zhang et al. | | |
| 2012/0201315 A1 | 8/2012 | Zhang et al. | | |
| 2012/0230448 A1* | 9/2012 | Kang | ................ | H03M 13/6527 375/295 |
| 2012/0236971 A1* | 9/2012 | Taghavi Nasrabadi | ............. | H04L 5/0023 375/340 |
| 2012/0263156 A1* | 10/2012 | Abraham | ............. | H04L 5/0023 370/338 |
| 2012/0269069 A1* | 10/2012 | Porat | ................ | H04W 72/1231 370/241 |
| 2012/0269123 A1* | 10/2012 | Porat | ................... | H04L 1/0041 370/328 |

OTHER PUBLICATIONS

Porat et al., "Intrroductory TGah Proposal", IEEE 802.111-11/0069R1, Jan. 16, 2011, 12 pages.

Stacey et al., "Proposed TGac Draft Amendment", IEEE P802.11-10/1361r3, Jan. 18, 2011, pp. 1-100.

Stacey et al., "Proposed TGac Draft Amendment", IEEE P802.11-10/1361r3, Jan. 18, 2011, pp. 101-154.

Office Action received for European Patent Application No. 11864433.5, mailed May 3, 2016, 5 pages.

Zhang et al., "11ah Premble for 2MHz and Beyond", IEEE 802.11-11/1483r0, Nov. 2011, 17 pages.

Heejung Yu et al., Coverage extention for IEE802. 11ah, IEEE 802.11-11/0035r1, Jan. 12, 2011.

Chin-Hung (Jackson) Chen et al., Proposed TGac Draft Amendment, IEEE 80211-10/1361r3, IEEE, Nov. 11, 2010, pp. 75-154.

* cited by examiner

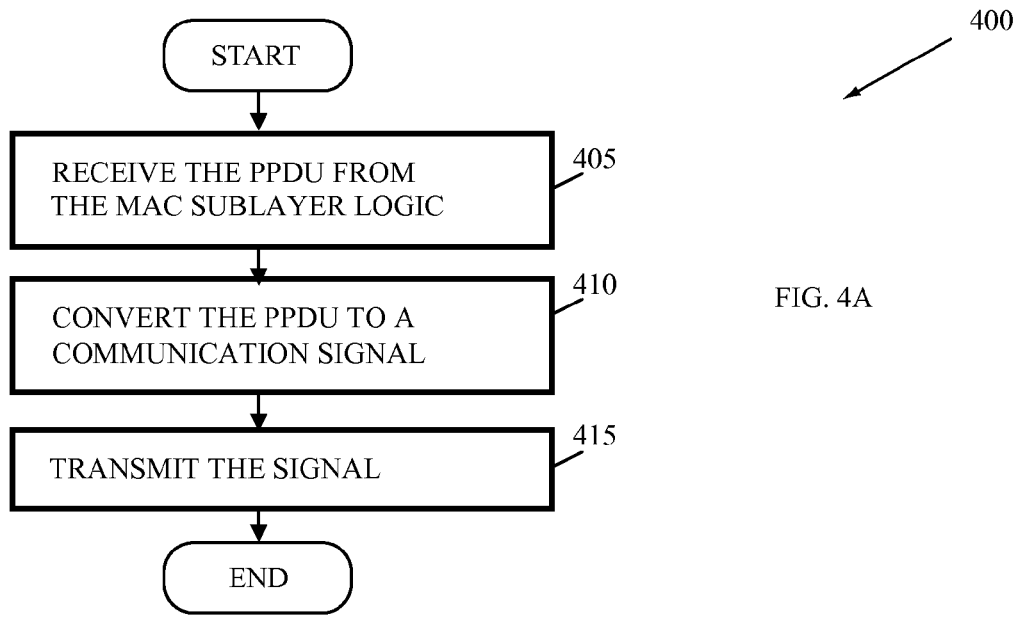

METHODS AND ARRANGEMENTS FOR LOW POWER WIRELESS NETWORKS

CROSS-REFERENCE TO RELATED APPLICATIONS

This application is a continuation of, claims the benefit of, and priority to U.S. patent application Ser. No. 13/977,698 filed Feb. 26, 2014, which is a U.S. national phase application of PCT/US2011/068253 filed Dec. 30, 2011, which claims priority to U.S. provisional patent application Ser. No. 61/479,024, filed Apr. 26, 2011; all of the above are incorporated by reference herein in their entirety.

BACKGROUND

Embodiments are in the field of wireless communications. More particularly, embodiments are in the field of communications protocols between wireless transmitters and receivers.

BRIEF DESCRIPTION OF THE DRAWINGS

FIGS. 4A-B depict embodiments of flowcharts to transmit and receive communications with a transmitter and a receiver as illustrated in FIG. 2.

DETAILED DESCRIPTION OF EMBODIMENTS

Figure 1:
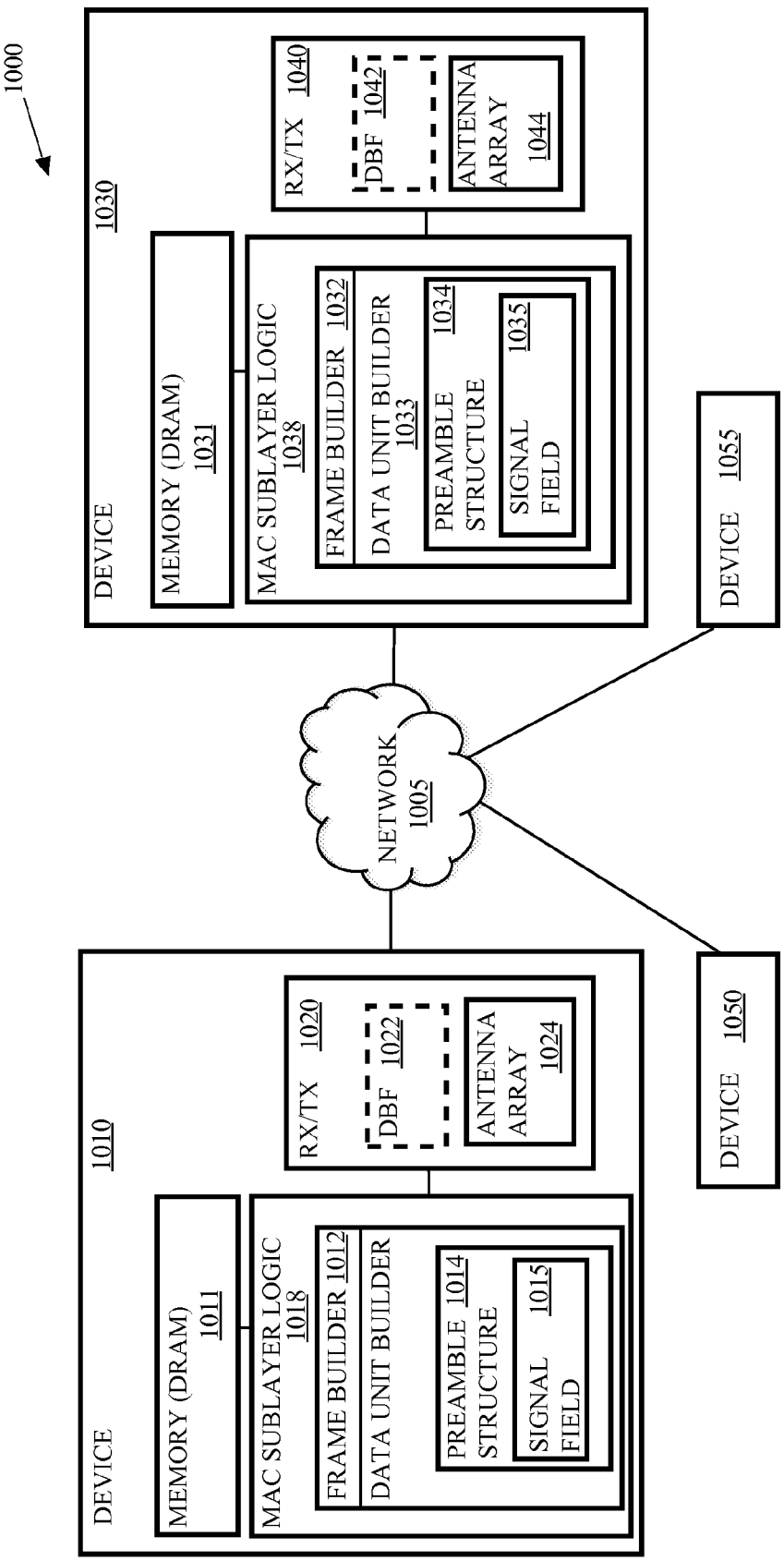
FIG. 1 depicts an embodiment of an example wireless network comprising a plurality of communications devices, including multiple fixed or mobile communications devices.

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

Embodiments may comprise an orthogonal frequency division multiplexing (OFDM) system operating in the 1 GHz and lower frequency bands. In many embodiments, physical layer logic may implement a new preamble structure with a new signal field. Some embodiments may provide, e.g., indoor and/or outdoor "smart" grid and sensor services. For example, some embodiments may provide sensors to meter the usage of electricity, water, gas, and/or other utilities for a home or homes within a particular area and wirelessly transmit the usage of these services to a meter substation. Further embodiments may utilize sensors for home healthcare, clinics, or hospitals for monitoring healthcare related events and vital signs for patients such as fall detection, pill bottle monitoring, weight monitoring, sleep apnea, blood sugar levels, heart rhythms, and the like. Embodiments designed for such services generally require much lower data rates and much lower (ultra low) power consumption than devices provided in IEEE 802.11n/ac systems.

Some embodiments reuse the IEEE 802.11n/ac system with new features that meet these lower data rate and ultra low power consumption requirements to reuse hardware implementations and to reduce implementation costs. In some embodiments, the new preamble structure may use a short training field (STF) and a long training field (LTF) from the IEEE 802.11ac and IEEE 802.11ag systems, reducing the cost of implementations. Further embodiments accommodate multiple streams. Several embodiments do not implement legacy training fields and legacy signatures and do not implement multi-user, Multiple Input, Multiple Output (MIMO). And some embodiments employ beamforming.

In the frequency bands of 1 GHz and lower, the available bandwidth is restricted, thus an IEEE 802.11n/ac type system that uses bandwidths of 20, 40, 80 and 160 MHz may not be practicable in some geographic regions. In many embodiments, the systems have bandwidths on the order of approximately 1 to 10 MHz. In several embodiments, an 802.11n/ac type system may be down-clocked to achieve lower bandwidths. For instance, many embodiments are down-clocked by N, such as 20 MHz divided by N, where N could take on values of 2, 4, 8, 10, and 20 (providing 10, 5, 2.5, 2, and 1 MHz bandwidth operation). Further embodiments are down-clocked by N, such as 160 MHz divided by N, where N could take on values of 10, 20, 40, 80, and 160 (providing 16, 8, 4, 2, and 1 MHz bandwidth operation). In several embodiments, the bandwidths may also be based on the tone count for those IEEE 802.11ac systems. In some embodiments, the tone counts may be the same as those IEEE 802.11ac systems. In other embodiments, the tone counts may be different from those IEEE 802.11ac systems, removing, for example, tone counts that are not unnecessary at the lower bandwidths.

Embodiments of the preamble structure may implement the new signal field, 11ah-SIG. The preamble structure may define an STF and an LTF to train the antennas for one stream operation, followed by the signal field and the data payload. In some embodiments, the signal field may be preceded by a guard interval (GI) and followed by additional LTFs to accommodate additional multiple input, multiple output (MIMO) streams. Other embodiments do not comprise the additional LTFs because they communicate via a single stream.

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Some embodiments may integrate low power wireless communications like Bluetooth®, wireless local area networks (WLANs), wireless metropolitan area networks (WMANs), wireless personal area networks (WPAN), cellular networks, Institute of Electrical and Electronic Engineers (IEEE) IEEE 802.11-2007, IEEE Standard for Information technology- Telecommunications and information exchange between systems—Local and metropolitan area networks—Specific requirements—Part 11: Wireless LAN Medium Access Control (MAC) and Physical Layer (PHY) Specifications (http://standards.ieee.org/getieee802/download/802.11-2007.pdf), communications in networks, messaging systems, and smart-devices to facilitate interaction between such devices. Furthermore, some wireless embodiments may incorporate a single antenna while other embodiments may employ multiple antennas.

Turning now to FIG. 1, there is shown an embodiment of a wireless communication system 1000. The wireless communication system 1000 comprises a communications device 1010 that is wire line or wirelessly connected to a network 1005. The communications device 1010 may communicate wirelessly with a plurality of communication devices 1030, 1050, and 1055 via the network 1005. The communications devices 1010, 1030, 1050, and 1055 may comprise sensors, stations, access points, hubs, switches, routers, computers, laptops, notebooks, cellular phones, PDAs (Personal Digital Assistants), or other wireless-capable devices. Thus, communications devices may be mobile or fixed. For example, the communications device 1010 may comprise a metering substation for water consumption within a neighborhood of homes. Each of the homes within the neighborhood may comprise a communications device such as the communications device 1030 and the communications device 1030 may be integrated with or coupled to a water meter usage meter. Periodically, the communications device 1030 may initiate communications with the metering substation to transmit data related to water usage. Furthermore, the metering station or other communications device may periodically initiate communications with the communications device 1030 to, e.g., update firmware of the communications device 1030. In other embodiments, the communications device 1030 may only respond to communications and may not comprise logic that initiates communications.

In further embodiments, the communications device 1010 may facilitate data offloading. For example, communications devices that are low power sensors may include a data offloading scheme to, e.g., communicate via Wi-Fi, another communications device, a cellular network, or the like for the purposes of reducing power consumption consumed in waiting for access to, e.g., a metering station and/or increasing availability of bandwidth. Communications devices that receive data from sensors such as metering stations may include a data offloading scheme to, e.g., communicate via Wi-Fi, another communications device, a cellular network, or the like for the purposes of reducing congestion of the network 1005.

The network 1005 may represent an interconnection of a number of networks. For instance, the network 1005 may couple with a wide area network such as the Internet or an intranet and may interconnect local devices wired or wirelessly interconnected via one or more hubs, routers, or switches. In the present embodiment, network 1005 communicatively couples communications devices 1010, 1030, 1050, and 1055.

The communication devices 1010 and 1030 comprise memory 1011 and 1031, and medium access control (MAC) sublayer logic 1018 and 1038, respectively. The memory 1011, 1031 such as dynamic random access memory (DRAM) may store the frames, preambles, and preamble structures 1014 and 1034, or portions thereof. The frames, also referred to as MAC layer protocol data units (MPDUs), and the preamble structures 1014 and 1034 may establish and maintain synchronized communications between the transmitting device and the receiving device. The preamble structures 1014 and 1034 may also establish the communications format and rate. In particular, preambles generated or determined based upon the preamble structures 1014 and 1034 may train, e.g., the antenna arrays 1024 and 1044 to communicate with each other, establish the modulation and coding scheme of the communications, the bandwidth or bandwidths of the communications, the length of the transmission vector (TXvector), the application of beamforming, and the like.

The MAC sublayer logic 1018, 1038 may generate the frames and the physical layer (PHY) logic 1019, 1039 may generate physical layer data units (PPDUs). More specifically, the frame builders 1012 and 1032 may generate frames and the data unit builders 1013 and 1033 may generate PPDUs. The data unit builders 1013 and 1033 may generate PPDUs by encapsulating payloads comprising the frames generated by frame builders 1012 and 1032. In the present embodiment, the data unit builders 1013 and 1033 may encapsulate the frames with preambles based upon preamble structures 1014 and 1034, respectively, to prefix the payloads to be transmitted over one or more RF channels. The function of a data unit builder, such as the data unit builder 1013 or 1033, is to assemble groups of bits into code words or symbols that make up the preambles as well as the payloads so the symbols can be converted into signals to transmit via antenna arrays 1024 and 1044, respectively.

Each data unit builder 1013, 1031 may supply a preamble structure 1014, 1034 comprising a signal field 1015, 1035 and store the preambles generated based upon the preamble structure 1014, 1034 in the memory 1011, 1031 while the preambles are being generated and/or after the preambles are generated. In the present embodiment, the preamble structure 1014, 1034 may comprise one short training field (STF) and one long training field (LTF) prior to the signal field 1015, 1035 and the data payload. The STF and the LTF may train the antenna arrays 1022 and 1042 to communicate with each other by making measurements related to communications such as measurements related to relative frequency, amplitude, and phase variations between quadrature signals. In particular, the STF may be used for packet detection, automatic gain control, and coarse frequency estimation. The LTF may be used for channel estimation, timing, and fine frequency estimation for a spatial channel.

The signal field 1015, 1035 provides data related to establishing communications including, for example, bits representing the modulation and coding scheme MCS, bandwidth, length, beamforming, space time block coding (STBC), coding, aggregation, short guard interval (Short GI), cyclic redundancy check (CRC), and a tail. In some embodiments, for instance, the signal field 1015, 1035 may comprise an MCS including Binary Phase-Shift Keying (BPSK) with a coding rate of ½ or a 256-point constellation, Quadrature Amplitude Modulation (256-QAM) with a coding rate of ¾. In further embodiments, the signal field 1015, 1035 includes a modulation technique such as Staggered-Quadrature, Phase-Shift Keying (SQPSK). In many embodiments, the MCS establishes communication with 1 to 4 spatial streams.

In several embodiments, the signal field 1015, 1035 may comprise bandwidths including 20 Megahertz (MHz) divided by N, 40 MHz divided by N, 80 MHz divided by N, or 160 MHz divided by N, wherein N is an integer and the bandwidths fall between 1 and 10 MHz. For example, bandwidths may include 160 MHz divided by N, wherein N equals 160, 80, 40, 20, and 10, which results in bandwidths of 1 MHz, 2 MHz, 4 MHz, 8 MHz, and 16 MHz. In further embodiments, bandwidths may include 20 MHz divided by N, wherein N equals 2, 4, 8, 10, 16, and 20, which results in bandwidths of 1 MHz, 1.25 MHz, 2 MHz, 2.5 MHz, 5 MHz, and 10 MHz.

The communications devices 1010, 1030, 1050, and 1055 may each comprise a transceiver (RX/TX) such as transceivers (RX/TX) 1020 and 1040. Each transceiver 1020, 1040 comprises an RF transmitter and an RF receiver. Each RF transmitter impresses digital data onto an RF frequency for transmission of the data by electromagnetic radiation. An RF receiver receives electromagnetic energy at an RF frequency and extracts the digital data therefrom. FIG. 1 may depict a number of different embodiments including a Multiple-Input, Multiple-Output (MIMO) system with, e.g., four spatial streams, and may depict degenerate systems in which one or more of the communications devices 1010, 1030, 1050, and 1055 comprise a receiver and/or a transmitter with a single antenna including a Single-Input, Single Output (SISO) system, a Single-Input, Multiple Output (SIMO) system, and a Multiple-Input, Single Output (MISO) system. The wireless communication system 1000 of FIG. 1 is intended to represent an Institute for Electrical and Electronics Engineers (IEEE) 802.11ah system. Similarly, devices 1010, 1030, 1050, and 1055 are intended to represent IEEE 802.11ah devices.

In many embodiments, transceivers 1020 and 1040 implement orthogonal frequency-division multiplexing (OFDM). OFDM is a method of encoding digital data on multiple carrier frequencies. OFDM is a frequency-division multiplexing scheme used as a digital multi-carrier modulation method. A large number of closely spaced orthogonal sub-carrier signals are used to carry data. The data is divided into several parallel data streams or channels, one for each sub-carrier. Each sub-carrier is modulated with a modulation scheme at a low symbol rate, maintaining total data rates similar to conventional single-carrier modulation schemes in the same bandwidth.

An OFDM system uses several carriers, or "tones," for functions including data, pilot, guard, and nulling. Data tones are used to transfer information between the transmitter and receiver via one of the channels. Pilot tones are used to maintain the channels, and may provide information about time/frequency and channel tracking. Guard tones may be inserted between symbols such as the STF and LTF symbols during transmission to avoid inter-symbol interference (ISI), which might result from multi-path distortion. These guard tones also help the signal conform to a spectral mask. The nulling of the direct component (DC) may be used to simplify direct conversion receiver designs.

In one embodiment, the communications device 1010 optionally comprises a digital beam former (DBF) 1022, as indicated by the dashed lines. The DBF 1022 transforms information signals into signals to be applied to elements of an antenna array 1024. The antenna array 1024 is an array of individual, separately excitable antenna elements. The signals applied to the elements of the antenna array 1024 cause the antenna array 1024 to radiate one to four spatial channels. Each spatial channel so formed may carry information to one or more of the communications devices 1030, 1050, and 1055. Similarly, the communications device 1030 comprises a transceiver 1040 to receive and transmit signals from and to the communications device 1010. The transceiver 1040 may comprise an antenna array 1044 and, optionally, a DBF 1042. In parallel with digital beam forming, the transceiver 1040 is capable of communicating with IEEE 802.11ah devices.

Figure 1A:
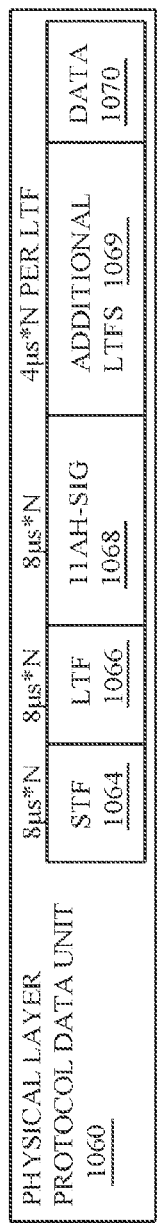
FIG. 1A depicts an embodiment of a preamble for establishing communications between wireless communication devices.

FIG. 1A depicts an embodiment of a physical layer protocol data unit (PPDU) 1060 with a preamble structure 1062 for establishing communications between wireless communication devices such as communications devices 1010, 1030, 1050, and 1055 in FIG. 1. The PPDU 1060 may comprise a preamble structure 1062 including orthogonal frequency division multiplexing (OFDM) training symbols for a single multiple input, multiple output (MIMO) stream followed by a signal field, followed by additional OFDM training symbols for additional MIMO streams, and the preamble structure 1060 may be followed by the data payload. In particular, the PPDU 1060 may comprise a short training field (STF) 1064, a long training field (LTF) 1066, the 11AH-SIG 1068, additional LTFs 1069, and data 1070. The STF 1064 may comprise a number of short training symbols such as 10 short training symbols that are 0.8 microseconds (μs) times N in length, wherein N is an integer representing the down-clocking factor from a 20 MHz channel spacing. For instance, the timing would double for 10 MHz channel spacing. The total time frame for the STF 1064 at a 20 MHz channel spacing is 8 μs times N.

The LTF 1066 may comprise a guard interval (GI) symbol and two long training symbols. The guard interval symbol may have a duration of 1.6 μs times N and each of the long training symbols may have durations of 3.2 μs times N at the 20 MHz channel spacing. The total time frame for the LTF 1066 at a 20 MHz channel spacing is 8 μs times N.

Figure 1B:
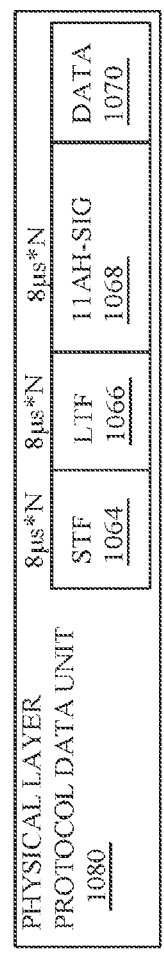
FIG. 1B depicts an alternative embodiment of a preamble structure for establishing communications between wireless communication devices.
Figure 1C:
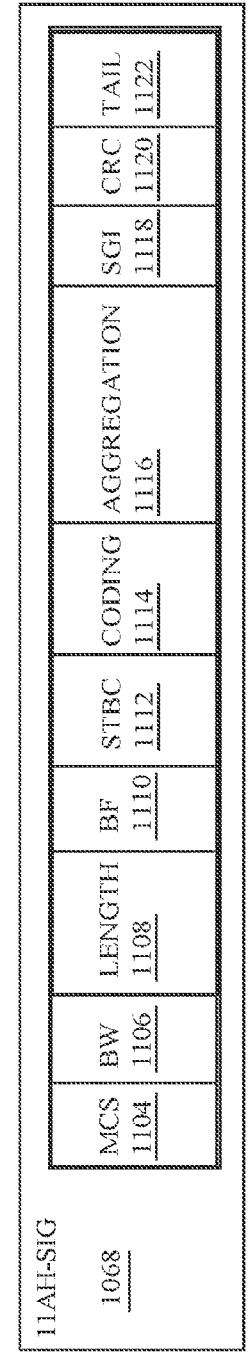
FIG. 1C depicts an embodiment of a signal field.

The 11ah-SIG 1068 may comprise a GI symbol at 0.8 μs times N and signal field symbols at 7.2 μs times N such as the symbols described in FIG. 1C. The additional LTFs 1069 may comprise one or more LTF symbols for additional MIMO streams if needed at 4 μs times N at 20 MHz channel spacing. The data 1070 may comprise one or more MAC sublayer protocol data units (MPDUs) and may include one or more GIs. For example, data 1070 may comprise one or more sets of symbols including a GI symbol at 0.8 μs times N at the 20 MHz channel spacing followed by payload data at 3.2 μs times N at the 20 MHz channel spacing.

The present embodiment may comprise five allowed bandwidths such as 1 MHz, 2 MHz, 4 MHz, 8 MHz and 16 MHz. In some embodiments, the preamble generated in accordance with the preamble structure 1062 may be replicated into, e.g., two bandwidths such as two 1 MHz bandwidths. Once the data portion starts, replication may no longer occur and new tone allocations may be implemented. For instance, the tone allocation for the preamble may be fixed at 56 tones for the lowest bandwidth (1 MHz), may be replicated to get a total of 112 tones for the next bandwidth (2 MHz), may be replicated for a total of 224 tones for the next bandwidth (4 MHz), may be replicated again for a total of 448 tones for the next bandwidth (8 MHz), and may be replicated again for a total of 896 tones for the largest bandwidth (16 MHz). The tone allocation for the data 1070 may be set at 56 tones (52 data tones plus 4 pilot tones) for a 1 MHz bandwidth, 114 tones (108 tones for the data plus 6 pilot tones) for a 2 MHz bandwidth, 242 tones (234 data tones plus 8 pilot tones) for a 4 MHz bandwidth, 484 tones (468 tones for the data plus 16 pilot tones) for a 8 MHz bandwidth, and 968 tones (936 tones for the data plus 32 pilot tones) for a 16 MHz bandwidth.

FIG. 1B depicts an alternative embodiment of a physical layer protocol data unit (PPDU) 1080 with a preamble structure 1082 for establishing communications between wireless communication devices such as communications devices 1010, 1030, 1050, and 1055 in FIG. 1. The PPDU 1080 may comprise a preamble structure 1082 including orthogonal frequency division multiplexing (OFDM) training symbols for a single multiple input, multiple output (MIMO) stream followed by a signal field, and the data payload may follow the preamble structure 1080. In particular, the PPDU 1080 may comprise a short training field (STF) 1064, a long training field (LTF) 1066, the 11AH-SIG 1068, and data 1070.

FIG. 1C depicts an embodiment of a signal field, 11AH-SIG 1068 for establishing communications between wireless communication devices such as communications devices 1010, 1030, 1050, and 1055 in FIG. 1. While the number, types, and content of the fields may differ between embodiments, the present embodiment may comprise a signal field with a sequence of bits for a modulation and coding scheme (MCS) 1104 parameter, a bandwidth (BW) 1106 parameter, a length 1108 parameter, a beamforming (BF) 1110 parameter, a space-time block coding (STBC) 1112 parameter, a coding 1114 parameter, an aggregation 1116 parameter, a short guard interval (SGI) 1118 parameter, a cyclic redundancy check (CRC) 1120 parameter, and a tail 1122 parameter.

The MCS 1104 parameter may comprise six bits and may designate binary phase-shift keying (BPSK), 16-point constellation quadrature amplitude modulation (16-QAM), 64-point constellation quadrature amplitude modulation (64-QAM), 256-point constellation quadrature amplitude modulation (256-QAM), quadrature phase-shift keying (QPSK), or staggered quadrature phase-shift keying (SQPSK) as a modulation format for a communication. The selections may offer one to four spatial streams for the communication. The BPSK may have a coding rate of ½. The 256-QAM may have a coding rate of ¾. And the SQPSK, also referred to as OQPSK, may have a coding rate of ½ or ¾. In some embodiments, SQPSK is an allowed modulation format on the signal and data fields to extend the range of operation of the communications devices for, e.g., outdoor sensor monitoring.

The BW 1106 parameter may comprise 2 bits and may involve selecting a bandwidth from four bandwidths such as 2 MHz, 4 MHz, 8 MHz, and 16 MHz. Selection of a fifth bandwidth such as 1 MHz may also be selected via another method. In other embodiments, the BW 1106 parameter may offer four different bandwidths that are down-clocked by an integer N from 20 MHz, 40 MHz, 80 MHz, or 160 MHz. The number N may be any integer such as 1, 2, 3, 4, 5, 6, 7, 8, 9, 10, . . . .

The length 1108 parameter may comprise 16 bits and may describe the length of the transmit vector in octets. In some embodiments, the allowed values for the length 1108 parameter are in the range of 1 to 4095. The length 1108 parameter may indicate the number of octets in the MAC protocol data unit (MPDU) that the MAC sublayer logic is currently requesting the physical layer (PHY) device, e.g., the transceiver 1020, 1040 in FIG. 1, to transmit. The length 1108 parameter is used by the PHY to determine the number of octet transfers that will occur between the MAC and the PHY after receiving a request to start the transmission.

The beamforming (BF) 1110 parameter may comprise one bit and may designate whether or not the PHY will implement beamforming for transmission of the MPDU. The space-time block coding (STBC) 1112 parameter may comprise one bit and may designate whether or not to implement a space-time block coding such as Alamouti's code. And the coding 1114 parameter may comprise two bits and may designate whether to use binary convolutional coding (BCC) or low density parity check coding (LDPC).

The aggregation 1116 parameter may comprise one bit and may designate whether or not to mandate MPDU aggregation (A-MPDU). The short guard interval (SGI) 1118 parameter may comprise one or two bits and may designate the duration of the SGI. For example, one bit may be set to a logical one to designate a short guard interval or set to a logical zero to designate a long guard interval and the second bit may designate short guard interval length ambiguity mitigation.

The cyclic redundancy check (CRC) 1120 sequence parameter may comprise a six bit hash of 11ah-SIG 1068 for error checking and the tail 1122 parameter may comprise a six bit sequence of, e.g., logical zeros or ones, to designate the end of the signal field, 11ah-SIG 1068.

Figure 1D:
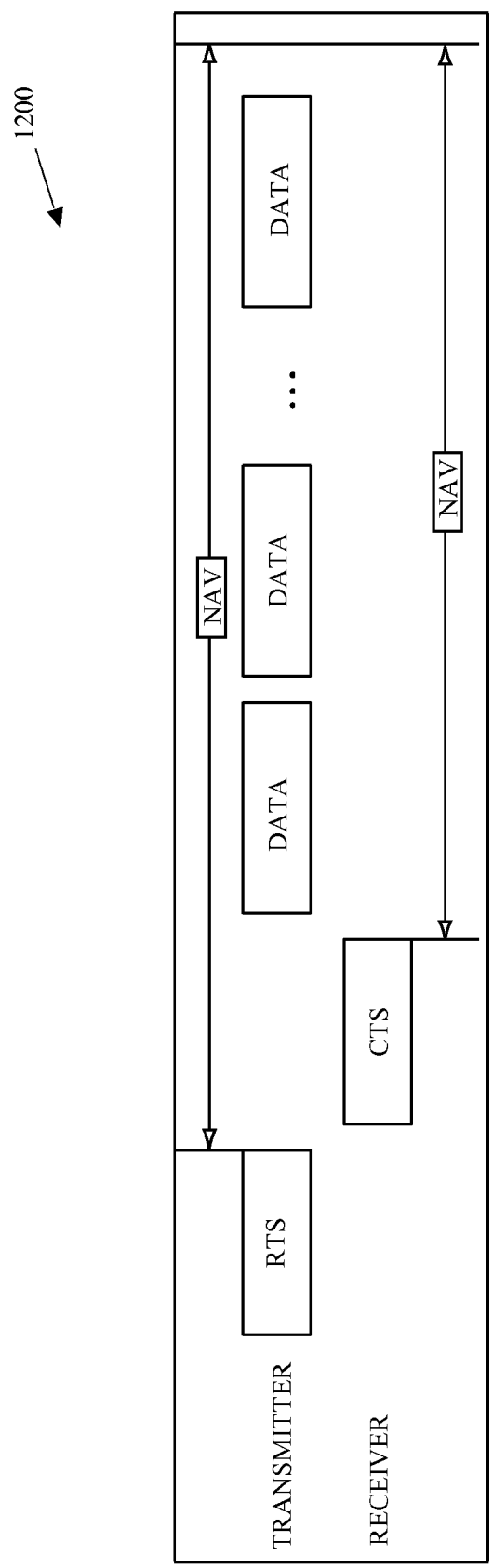
FIG. 1D depicts an embodiment of a protocol with a protection mechanism for establishing communications between wireless communication devices.

FIG. 1D illustrates an embodiment 1200 of an operation of one of the functions of a frame. In particular, FIG. 1D illustrates the use on a protected transmission operation (TxOP) for embodiments. Some embodiments may utilize the protected TxOP to inform devices other than the receiver prior to transmission of the frame that the other devices should refrain from transmitting for a particular duration of time. The particular duration of time may be time allocated for transmitting the frame. For instance, for embodiments that utilize Transmit beamforming (TxBF), beamforming may begin with the transmission of the signal field such as the signal field 1068 illustrated in FIG. 1C or the signal fields 1015 or 1035 in FIG. 1. As a result, some communications devices such as communications devices 1010, 1030, 1050, and 1055 may not be able to decode the signal field. In such embodiments, a virtual carrier sensing mechanism may be implemented the to instruct the communications devices to defer from accessing the communications medium such a network 1005 of FIG. 1 for a period of time.

As illustrated in FIG. 1D, to establish communications, a transmitter transmits a control frame comprising a Request To Send (RTS) field that is received by a receiver. The control frame also comprises an address field and a duration field (not shown in FIG. 1D). The address field indicates to which receiver the transmission is intended. The duration field comprises a Network Allocation Vector (NAV) that indicates the duration of time reserved for the transmission. After the RTS signal is sent, but before the data of the transmission is sent, the transmitter waits to receive a Clear To Send (CTS) signal from the receiver. If the CTS is not received within a short period of time, the intended transmission is temporarily abandoned and a new RTS signal may be sent later. Once the CTS signal is received in response to the RTS, the transmitter sends the data during the duration of the NAV, as shown in FIG. 1D. Devices other than the intended receiver may set their respective NAVs to refrain from communications throughout the duration of the NAV.

Figure 2:
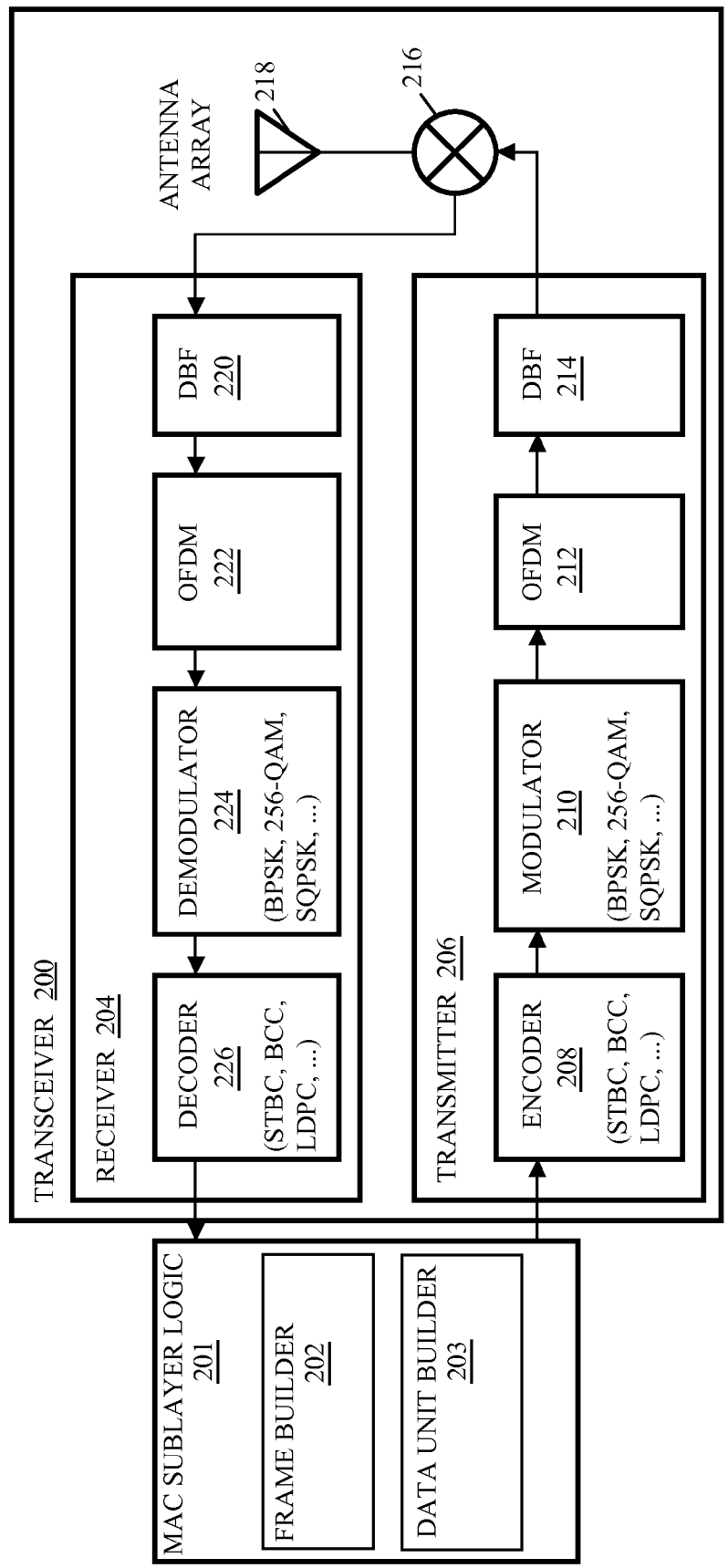
FIG. 2 depicts an embodiment of an apparatus to generate and transmit an Orthogonal Frequency Division Multiplexing (OFDM)-based communication in a wireless network.

FIG. 2 illustrates an embodiment of an apparatus to transmit an orthogonal frequency division multiplexing (OFDM)-based communication in a wireless network. The apparatus comprises a transceiver 200 coupled with medium access control (MAC) sublayer logic 201 and a physical layer (PHY) logic 250. The MAC sublayer logic 201 and PHY layer logic 250 may generate a physical layer protocol data unit (PPDU) to transmit via transceiver 200.

The MAC sublayer logic 201 may comprise hardware and/or code to implement data link layer functionality including generation of MAC protocol data units (MPDUs) from MAC service data units (MSDUs) by encapsulating the MSDUs in frames via a frame builder 202. For example, a frame builder may generate a frame including a type field that specifies whether the frame is a management, control or data frame and a subtype field to specify the function of the frame. A control frame may include a Ready-To-Send or Clear-To-Send frame. A management frame may comprise a Beacon, Probe Response, Association Response, and Reassociation Response frame type. The duration field that follows the first frame control field specifies the duration of this transmission. As discussed above, the duration field includes the Network Allocation Vector (NAV), which can be used as a protection mechanism for communications. And the data type frame is designed to transmit data. An address field may follow the duration field, specifying the address of the intended receiver or receivers for the transmission.

The PHY logic 250 may comprise a data unit builder 203. The data unit builder 203 may determine a preamble based upon a preamble structure such as the preamble structure illustrated in FIG. 1C to encapsulate the MPDU to generate a PPDU. In many embodiments, the data unit builder 203 may select a preamble from memory such as a default preamble for data frame transmissions, control frame transmissions, or management transmissions. In several embodiments, the data unit builder 203 may create the preamble based upon a default set of values for the preamble received from another communications device. For example, a data collection station compliant with IEEE 802.11ah for a farm may periodically receive data from low power sensors that have integrated wireless communications devices compliant with IEEE 802.11ah. The sensors may enter a low power mode for a period of time, wake to collect data periodically, and communicate with the data collection station periodically to transmit the data collected by the sensor. In some embodiments, the sensor may proactively initiate communications with the data collection station, transmit data indicative of a communications capability, and begin communicating the data to the data collection station in response to a CTS or the like. In other embodiments, the sensor may transmit data to the data collection station in response to initiation of communications by the data collection station.

The data unit builder 203 may generate the preamble including an STF, a guard interval, an LTF, and an 11ah-SIG field. In many embodiments, the data unit builder 203 may create the preamble based upon communications parameters chosen through interaction with another communications device. The data unit builder 203 may create the preamble with the 11ah-SIG field comprising an MCS field having six bits indicative of Binary Phase-Shift Keying with a coding rate of ½ and four spatial streams. The data unit builder 203 may determine a bandwidth from five allowed bandwidths such as 16 MHz, 8 MHz, 4 MHz, 2 MHz, and 1 MHz. In further embodiments wherein the bandwidths fall within 1 MHz to 10 MHz, four of the bandwidths may comprise sets of bandwidths such as 10 MHz, 6.7 MHz, 5 MHz, and 4 MHz; 10 MHz, 5 MHz, 4 MHz, and 2.5 MHz; 10 MHz, 5 MHz, 2.5 MHz, and 1.25 MHz; 5 MHz, 4 MHz, 3.3 MHz and 2.9 MHz, or the like. In other embodiments, sets of four bandwidths may comprise one or more bandwidths that are greater than 10 MHz such as 20 MHz, 10 MHz, 5 MHz, and 2.5 MHz; 40 MHz, 20 MHz, 10 MHz, and 5 MHz; 40 MHz, 20 MHz, 10 MHz, and 5 MHz; 26.7 MHz, 20 MHz, 16 MHz, and 13.3 MHz; or the like. The data unit builder 203 may set the BW bits to values representative of one of the four bandwidths of 10 MHz, 5 MHz, 2.5 MHz, and 1.25 MHz. And in many embodiments, a fifth bandwidth may be selected by another means within the 11 ah-SIG field such as a bandwidth parameter with a third bit, an extended data payload with one or more bits that indicate the fifth bandwidth, a setting of another bit within the 11ah-SIG field in conjunction with an indication of the bandwidth parameter being set to a particular bandwidth, or the like.

In many embodiments, the data unit builder 203 may create the preamble with the 11ah-SIG field comprising a length field that is 16 bits long with the least significant bit (LSB) first. The length field may comprise the length of the transmit vector (TXVECTOR). In further embodiments, the data unit builder 203 may create a preamble with the 11ah-SIG field comprising a coding bit to select low density parity check (LDPC) and an extra coding bit to offer LDPC duration ambiguity. The data unit builder 203 may create the preamble with the 11 ah-SIG field comprising a bit for transmit beamforming (TxBF). For example, some embodiments may set the TxBF bit to a logical one to indicate that the transmission should be beamformed for data packets to communications devices that have beamforming capabilities and may set the TxBF bit to a logical zero to indicate that the transmission should not be beamformed for, e.g., protection mechanism frames.

In several embodiments, the data unit builder 203 may create the preamble with the 11ah-SIG field comprising a short guard interval (SGI) field, which may be, e.g., 1.6 microseconds (µs) times N, wherein N is the integer by which the timing is down-clocked from 20 MHz channel spacing. The data unit builder 203 may also create the preamble with the 11ah-SIG field comprising a cyclic redundancy check (CRC) field for error correction and a tail comprising, e.g., six zero bits to enable decoding of, e.g., the MCS and length fields immediately after the reception of the tail bits.

In some embodiments, the data unit builder 203 may allocate tones for the preamble based upon IEEE 802.11n/ac tone allocations. For example, 56 tones may be allocated for the preamble for the 1.25 MHz bandwidth, 112 tones may be allocated for the 2.5 MHz bandwidth, 224 tones may be allocated for the 5 MHz bandwidth, and 448 tones may be allocated for the 10 MHz bandwidth. In many embodiments, the data unit builder 203 may allocate tones differently for the data or MPDU portion of the PPDU. For instance, 56 tones may be allocated for the data at the 1.25 MHz bandwidth, 114 tones may be allocated for the data at the 2.5 MHz bandwidth, 242 tones may be allocated for the data at the 5 MHz bandwidth, and 484 tones may be allocated for the data at the 10 MHz bandwidth.

The transceiver 200 comprises a receiver 204 and a transmitter 206. The transmitter 206 may comprise one or more of an encoder 208, a modulator 210, an OFDM 212, and a DBF 214. The encoder 208 of transmitter 206 receives data destined for transmission from the MAC sublayer logic 202. The MAC sublayer logic 202 may present data to transceiver 200 in blocks or symbols such as bytes of data. The encoder 208 may encode the data using any one of a number of algorithms now known or to be developed. Encoding may be done to achieve one or more of a plurality of different purposes. For example, coding may be performed to decrease the average number of bits that must be sent to transfer each symbol of information to be transmitted. Coding may be performed to decrease a probability of error in symbol detection at the receiver. Thus, an encoder may introduce redundancy to the data stream. Adding redundancy increases the channel bandwidth required to transmit the information, but results in less error, and enables the signal to be transmitted at lower power. Encoding may also comprise encryption for security.

In the present embodiment, the encoder 208 may implement a binary convolutional coding (BCC) or a low density parity check coding (LDPC), as well as other encodings.

The modulator 210 of transmitter 206 receives data from encoder 208. A purpose of modulator 210 is to transform each block of binary data received from encoder 208 into a unique continuous-time waveform that can be transmitted by an antenna upon up-conversion and amplification. The modulator 210 impresses the received data blocks onto a sinusoid of a selected frequency. More specifically, the modulator 210 maps the data blocks into a corresponding set of discrete amplitudes of the sinusoid, or a set of discrete phases of the sinusoid, or a set of discrete frequency shifts relative to the frequency of the sinusoid. The output of modulator 210 is a band pass signal.

In one embodiment, the modulator 210 may implement Quadrature Amplitude Modulation (QAM) impressing two separate k-bit symbols from the information sequence onto two quadrature carriers, cos (2πft) and sin(2πft). QAM conveys two digital bit streams, by changing (modulating) the amplitudes of two carrier waves, using the amplitude-shift keying (ASK) digital modulation scheme. The two carrier waves are out of phase with each other by 90° and are thus called quadrature carriers or quadrature components. The modulated waves are summed, and the resulting waveform is a combination of both phase-shift keying (PSK) and amplitude-shift keying (ASK). A finite number of at least two phases and at least two amplitudes may be used.

In another embodiment, the modulator 210 maps the blocks of data received from encoder 208 into a set of discrete phases of the carrier to produce a Phase-Shift Keyed (PSK) signal. An N-phase PSK signal is generated by mapping blocks of $k=\log_2 N$ binary digits of an input sequence into one of N corresponding phases $\theta=2\pi(n-1)/n$ for n a positive integer less than or equal to N. A resulting equivalent low pass signal may be represented as $$u(t) = \sum_{n=0}^{\infty} e^{j\theta_n} g(t - nT)$$

where g(t−nT) is a basic pulse whose shape may be optimized to increase the probability of accurate detection at a receiver by, for example, reducing inter-symbol interference. Such embodiments may use Binary Phase-Shift Keying (BPSK), the simplest form of phase-shift keying (PSK). BPSK uses two phases which are separated by 180° and is the most robust of all the PSKs since it takes the highest level of noise or distortion to make the demodulator reach an incorrect decision. In BPSK, there are two states for the signal phase: 0 and 180 degrees. The data is often differentially encoded prior to modulation.

In yet another embodiment, the modulator 210 maps the blocks of data received from encoder 208 alternately on two channels or streams called the I channel (for "in phase") and the Q channel ("phase quadrature"), which is referred to as staggered quadrature phase-shift keying (SQPSK). SQPSK is a method of phase-shift keying in which the signal carrier-wave phase transition is 90 degrees or ¼ cycle at a time. A phase shift of 90 degrees is known as phase quadrature. A single-phase transition does not exceed 90 degrees. In SQPSK, there are four states: 0, +90, −90 and 180 degrees.

The output of modulator 210 may be up-converted to a higher carrying frequency. Or, modulation may be performed integrally with up-conversion. Shifting the signal to a much higher frequency before transmission enables use of an antenna array of practical dimensions. That is, the higher the transmission frequency, the smaller the antenna can be. Thus, an up-converter multiplies the modulated waveform by a sinusoid to obtain a signal with a carrier frequency that is the sum of the central frequency of the waveform and the frequency of the sinusoid. The operation is based on the trigonometric identity:

$$\sin A \cos B = \frac{1}{2}[\sin(A+B) + \sin(A-B)]$$

The signal at the sum frequency (A+B) is passed and the signal at the difference frequency (A−B) is filtered out. Thus, a band pass filter is provided to ideally filter out all but the information to be transmitted, centered at the carrier (sum) frequency.

The output of modulator 210 may be fed to an orthogonal frequency division multiplexer (OFDM) 212 via a space-time block coding (STBC). OFDM 212 impresses the modulated data from modulator 210 onto a plurality of orthogonal sub-carriers. The output of the OFDM 212 is fed to the digital beam former (DBF) 214. Digital beam forming techniques are employed to increase the efficiency and capacity of a wireless system. Generally, digital beam forming uses digital signal processing algorithms that operate on the signals received by, and transmitted from, an array of antenna elements to achieve enhanced system performance. For example, a plurality of spatial channels may be formed and each spatial channel may be steered independently to maximize the signal power transmitted to and received from each of a plurality of user terminals. Further, digital beam forming may be applied to minimize multi-path fading and to reject co-channel interference.

The transceiver 200 may also comprise diplexers 216 connected to antenna array 218. Thus, in this embodiment, a single antenna array is used for both transmission and reception. When transmitting, the signal passes through diplexers 216 and drives the antenna with the up-converted information-bearing signal, x. During transmission, the diplexers 216 prevent the signals to be transmitted from entering receiver 204. When receiving, information bearing signals received by the antenna array pass through diplexers 216 to deliver the signal from the antenna array to receiver 204. The diplexers 216 then prevent the received signals from entering transmitter 206. Thus, diplexers 216 operate as switches to alternately connect the antenna array elements to the receiver 204 and the transmitter 206.

Antenna array 218 radiates the information bearing signals into a time-varying, spatial distribution of electromagnetic energy that can be received by an antenna of a receiver. The receiver can then extract the information of the received signal. An array of antenna elements can produce multiple spatial channels that can be steered to optimize system performance. Reciprocally, multiple spatial channels in the radiation pattern at a receive antenna can be separated into different spatial channels. Thus, a radiation pattern of antenna array 218 may be highly selective. The antenna array 218 may be implemented using printed circuit board metallization technology. Microstrips, striplines, slotlines, and patches, for example, are all candidates for the antenna array 218.

The transceiver 200 may comprise a receiver 204 for receiving, demodulating, and decoding information bearing signals. The receiver 204 may comprise one or more of a DBF 220, an OFDM 222, a demodulator 224 and a decoder 226. The received signals are fed from antenna elements 218 to a DBF 220. The DBF 220 transforms N antenna signals into L information signals.

The output of the DBF 220 is fed to the OFDM 222. The OFDM 222 extracts signal information from the plurality of subcarriers onto which information-bearing signals are modulated.

The demodulator 224 demodulates the received signal. Demodulation is the process of extracting information from the received signal to produce an un-demodulated information signal. The method of demodulation depends on the method by which the information is modulated onto the received carrier signal. Thus, for example, if the modulation is BPSK, demodulation involves phase detection to convert phase information to a binary sequence. Demodulation provides to the decoder a sequence of bits of information. The decoder 226 decodes the received data from the demodulator 224 and transmits the decoded information, the MPDU, to the MAC sublayer logic 202.

Persons of skill in the art will recognize that a transceiver may comprise numerous additional functions not shown in FIG. 2 and that the receiver 204 and transmitter 206 can be distinct devices rather than being packaged as one transceiver. For instance, embodiments of a transceiver may comprise a dynamic random access memory (DRAM), a reference oscillator, filtering circuitry, synchronization circuitry, possibly multiple frequency conversion stages and multiple amplification stages, etc. Further, some of the functions shown in FIG. 2 may be integrated. For example, digital beam forming may be integrated with orthogonal frequency division multiplexing.

Figure 3:
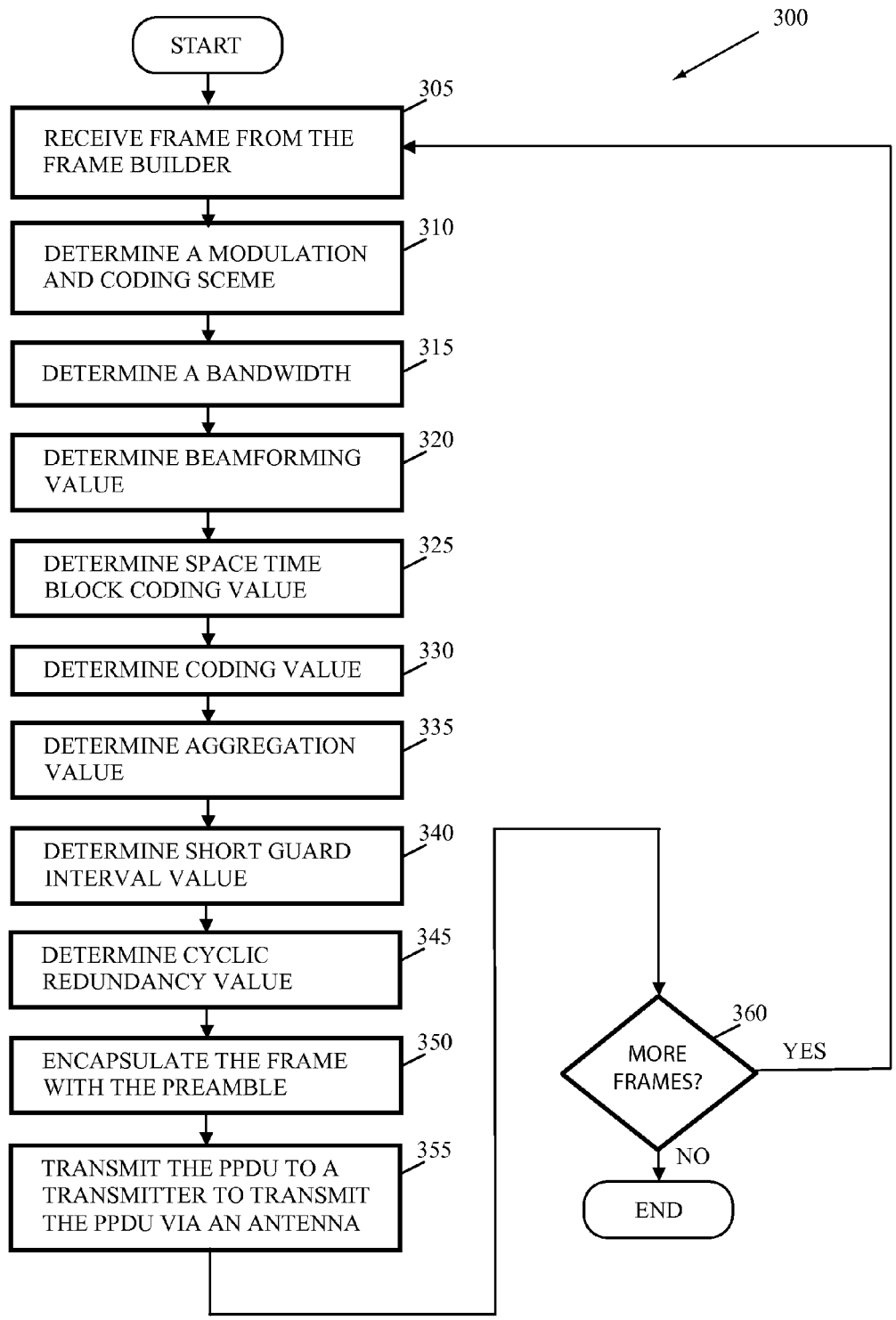
FIG. 3 depicts an embodiment of a flowchart for generating a preamble structure such as the preamble structures illustrated in FIGS. 1A and 1B.

FIG. 3 depicts an example flowchart 300 for generating a preamble structure such as the preamble structures illustrated in FIGS. 1A and 1B. The flowchart 300 begins with receiving a frame from the frame builder (element 305). The MAC sublayer logic may generate a frame to transmit to another communications device and may pass the frame as an MPDU to a data unit builder that transforms the data into a packet that can be transmitted to the other communications device. The data unit builder may generate a preamble based upon a preamble structure, like the preamble structure 1062 in FIG. 1A, to encapsulate the PSDU (the MPDU from the frame builder) to form a PPDU for transmission. In some embodiments, more than one MPDU may be encapsulated in a PPDU.

The data unit builder may determine or create a preamble to encapsulate the frame with one or more of the elements 310 through 345. In generating the preamble, the data unit builder may generate a signal field such as 11ah-SIG 1068 in FIGS. 1A-C although the fields and their content may differ from the fields described with respect to FIG. 1C. To generate the signal field, the data unit builder may determine a modulation and coding scheme for the PPDU (element 310). The data builder may select a default modulation and coding scheme, select a modulation and coding scheme indicated via communications with the other communications device, or otherwise select a modulation and coding scheme. In many embodiments, the data unit builder may select a modulation and coding scheme from a group of modulation and coding schemes comprising BPSK at a rate of ½, 256-QAM at a rate of ¾, or SQPSK.

While the generation of fields of the preamble may occur in any order or may comprise selection of a preamble from memory, the present embodiment may determine the bandwidth of the communication (element 315) after determining the modulation and coding scheme. Determining the bandwidth may comprise selecting a bandwidth from five bandwidths such as 1 MHz, 2 MHz, 4 MHz, 8 MHz and 16 MHz.

The data unit builder may determine if beamforming should be implemented by setting the beamforming bit (element 320). The data unit builder may set the beamforming bit to a logical one to implement beamforming for data frames and may set the beamforming bit to a logical zero to turn off beamforming for a number of different reasons. For instance, beamforming may be turned off when the communications device originating the transmission or the communications device to which the transmission is addressed does not support beamforming.

In many embodiments, the data unit builder determines the space-time block coding (STBC) bit (element 325) by setting the bit to a logical one turn on STBC and to a logical zero to turn off STBC. STBC may transmit multiple copies of a data stream across a number of antennas and to exploit the various received copies of the data to improve the reliability of data-transfer. This redundancy results in a higher chance of being able to use one or more of the received copies to correctly decode the received signal. In several embodiments, STBC combines all the copies of the received signal to extract as information from each of the copies.

After determining the STBC value, the data unit builder may determine the coding value (element 330). The data unit builder may determine whether to use binary convolutional coding (BCC) or low density parity check coding (LDPC). In some embodiments, the coding parameter may include an extra bit for LDPC duration ambiguity. The BCC may be viewed as a linear finite-state shift register with an output sequence comprising a set of linear combinations of the input sequence. The number of output bits from the shift register for each input bit may be a measure of the redundancy in the code. And the LDPC code is a linear error correcting code, a method of transmitting a message over a noisy transmission channel, and may be constructed using a sparse bipartite graph. LDPC codes are capacity-approaching codes, which can be decoded in time linear to their block length and are defined by a sparse parity-check matrix.

In some embodiments, the data unit builder may determine the aggregation value by setting the aggregation value to a logical one to mandate an aggregated MPDU (A-MPDU) (element 335). In mandating an aggregated MPDU, the data unit builder may require that each data transmission of a PPDU include more that one MPDU in the data payload. Because management information needs to be specified only once per PPDU, the ratio of payload data to the total volume of data transmitted is higher, allowing lower power consumption.

The data unit builder may then determine the short guard interval (SGI) value (element 340). In many embodiments, the data unit builder may select between two or more SGI values. For example, the data unit builder may set the SGI value to a logical zero to select an SGI of 400 nanoseconds and set the SGI value to a logical one to select an SGI of 600 nanoseconds.

In several embodiments, the data builder may complete the preamble with a cyclic redundancy check (CRC) (element 345) and a tail. The CRC may include, e.g., a type of hash function used to produce a checksum in order to detect errors in data transmission and the tail may comprise a series of bits such as six logical zeros to designate the end of the preamble.

After determining the preamble, the data unit builder may encapsulate the frame (MPDU), or multiple frames if A-MPDU is set to a logical one, with the preamble to generate a PPDU for transmission to another communications device (element 350). The PPDU may then be transmitted to the physical layer device such as the transmitter 206 in FIG. 2 or the transceiver 1020,1040 in FIG. 1 so the PPDU may be converted to a signal based upon the preamble and transmitted via an antenna (element 355). If more frames are received (element 360) from the frame builder then additional PPDUs may be determined in elements 310 through 350.

FIGS. 4A-B depict embodiments of flowcharts to transmit and receive communications with a transmitter and a receiver as illustrated in FIG. 2. Referring to FIG. 4A, the flowchart 400 begins with a transmitter such as transmitter 206 receiving a PPDU from MAC sublayer logic via PHY logic (element 405). The transmitter may convert the PPDU to a communication signal (element 410) that can be transmitted via an antenna such as an antenna element of antenna array 218. More specifically, the transmitter may encode the PPDU via one or more encoding schemes described in a preamble of the PPDU such as BCC or LDPC. The transmitter may modulate the PPDU via a modulation and coding scheme indicated by the preamble such as BPSK, 16-QAM, 64-QAM, 256-QAM, QPSK, or SQPSK. The transmitter may divide the data amongst the subcarriers via OFDM in accordance with the preamble and the transmitter may beamform signals to create a communication signal. Thereafter, the transmitter may transmit the communication signal to the antenna(s) to transmit the signal to another communications device (element 415).

Referring to FIG. 4B, the flowchart 450 begins with a receiver such as the receiver 204 receiving a communication signal via one or more antenna(s) such as an antenna element of antenna array 218 (element 455). The receiver may convert the communication signal to a MPDU in accordance with the process described in the preamble (element 460) such as a preamble based upon the preamble structure 1062 or 1082 in FIGS. 1A-B. More specifically, the received signal is fed from the one or more antennas to a DBF such as the DBF 220 illustrated in FIG. 2. The DBF transforms the antenna signals into information signals such as illustrated in FIG. 3B. The output of the DBF is fed to OFDM such as the OFDM 222. The OFDM extracts signal information from the plurality of subcarriers onto which information-bearing signals are modulated. Then, the demodulator such as the demodulator 224 demodulates the signal information via, e.g., BPSK, 256-QAM, or SQPSK. And the decoder such as the decoder 226 decodes the signal information from the demodulator via, e.g., BCC or LDPC, to extract the MPDU (element 460) and transmits the MPDU to MAC sublayer logic such as MAC sublayer logic 202 (element 465).

Another embodiment is implemented as a program product for implementing systems and methods described with reference to FIGS. 1-4. Some embodiments can take the form of an entirely hardware embodiment, an entirely software embodiment, or an embodiment containing both hardware and software elements. One embodiment is implemented in software, which includes but is not limited to firmware, resident software, microcode, etc.

Furthermore, embodiments can take the form of a computer program product (or machine-accessible product) accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

The logic as described above may be part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product.

What is claimed is:

1. An apparatus, comprising:
at least one memory; and
logic, at least a portion of which is in hardware, the logic to detect a preamble in a physical protocol data unit (PPDU), the PPDU to correspond to a below 1 GHz frequency band transmission, the PPDU to comprise a plurality of orthogonal frequency-division multiplexing (OFDM) symbols, the preamble to comprise a signal field comprising a bandwidth parameter to designate a bandwidth of the PPDU, the designated bandwidth to correspond to an Institute of Electrical and Electronics Engineers (IEEE) 802.11ac bandwidth reduced by a factor of 10, a data portion of the PPDU to be demodulated according to a first tone allocation that matches an IEEE 802.11ac tone allocation for the IEEE 802.11ac bandwidth, the first tone allocation to differ from a second tone allocation used for the preamble.

2. The apparatus of claim 1, the preamble to comprise an IEEE 802.11ac short training field (STF).

3. The apparatus of claim 1, the preamble to comprise an IEEE 802.11n short training field (STF).

4. The apparatus of claim 1, the preamble to comprise an IEEE 802.11ac long training field (LTF).

5. The apparatus of claim 1, the designated bandwidth to comprise one of: 2 MHz, 4 MHz, 8 MHz, and 16 MHz.

6. The apparatus of claim 1, the first tone allocation to comprise 52 data tones and 4 pilot tones.

7. The apparatus of claim 1, the first tone allocation to comprise 108 data tones and 6 pilot tones.

8. The apparatus of claim 1, the first tone allocation to comprise 234 data tones and 8 pilot tones.

9. The apparatus of claim 1, the first tone allocation to comprise 468 data tones and 16 pilot tones.

10. The apparatus of claim 1, the first tone allocation to comprise a greater number of data tones than the second tone allocation.

11. The apparatus of claim 1, the second tone allocation to comprise one or more replications of a tone allocation for a bandwidth lower than a bandwidth of the PPDU.

12. The apparatus of claim 1, the logic to detect a second preamble in a second PPDU to be received via the below 1 GHz frequency band, the second PPDU to comprise a 1 MHz bandwidth and to include a preamble comprising a second signal field indicating the 1 MHz bandwidth.

13. The apparatus of claim 1, comprising:
at least one processor; and
at least one radio frequency (RF) transceiver.

14. The apparatus of claim 13, comprising at least one RF antenna.

15. At least one non-transitory computer-readable storage medium comprising a set of instructions that, in response to being executed on a computing device, cause the computing device to:
detect a preamble in a physical protocol data unit (PPDU), the PPDU to correspond to a below 1 GHz frequency band transmission, the PPDU to comprise a plurality of orthogonal frequency-division multiplexing (OFDM) symbols, the preamble to comprise a signal field comprising a bandwidth parameter to designate a bandwidth of the PPDU, the designated bandwidth to correspond to a second bandwidth reduced by a factor of 10, a data portion of the PPDU to be received according to a first tone allocation that matches a tone allocation corresponding to the second bandwidth, the first tone allocation to differ from a second tone allocation used for the preamble.

16. The at least one non-transitory computer-readable storage medium of claim 15, the second bandwidth to comprise one of: 20 megahertz (MHz), 40 MHz, 80 MHz, and 160 MHz.

17. The at least one non-transitory computer-readable storage medium of claim 15, the preamble to comprise an Institute of Electrical and Electronics Engineers (IEEE) 802.11ac short training field (STF).

18. The at least one non-transitory computer-readable storage medium of claim 15, the preamble to comprise an Institute of Electrical and Electronics Engineers (IEEE) 802.11n short training field (STF).

19. The at least one non-transitory computer-readable storage medium of claim 15, the preamble to comprise an Institute of Electrical and Electronics Engineers (IEEE) 802.11ac long training field (LTF).

20. The at least one non-transitory computer-readable storage medium of claim 15, the first tone allocation to comprise 52 data tones and 4 pilot tones.

21. The at least one non-transitory computer-readable storage medium of claim 15, the first tone allocation to comprise 108 data tones and 6 pilot tones.

22. The at least one non-transitory computer-readable storage medium of claim 15, the first tone allocation to comprise 234 data tones and 8 pilot tones.

23. The at least one non-transitory computer-readable storage medium of claim 15, the first tone allocation to comprise 468 data tones and 16 pilot tones.

24. The at least one non-transitory computer-readable storage medium of claim 15, the first tone allocation to comprise a greater number of data tones than the second tone allocation.

25. The at least one non-transitory computer-readable storage medium of claim 15, the second tone allocation to comprise one or more replications of a tone allocation for a bandwidth lower than a bandwidth of the PPDU.

26. The at least one non-transitory computer-readable storage medium of claim 15, comprising instructions that, in response to being executed on the computing device, cause the computing device to detect a second preamble in a second PPDU to be received via the below 1 GHz frequency band, the second PPDU to comprise a 1 MHz bandwidth and to include a preamble comprising a second signal field indicating the 1 MHz bandwidth.

* * * * *